Patented Apr. 6, 1954

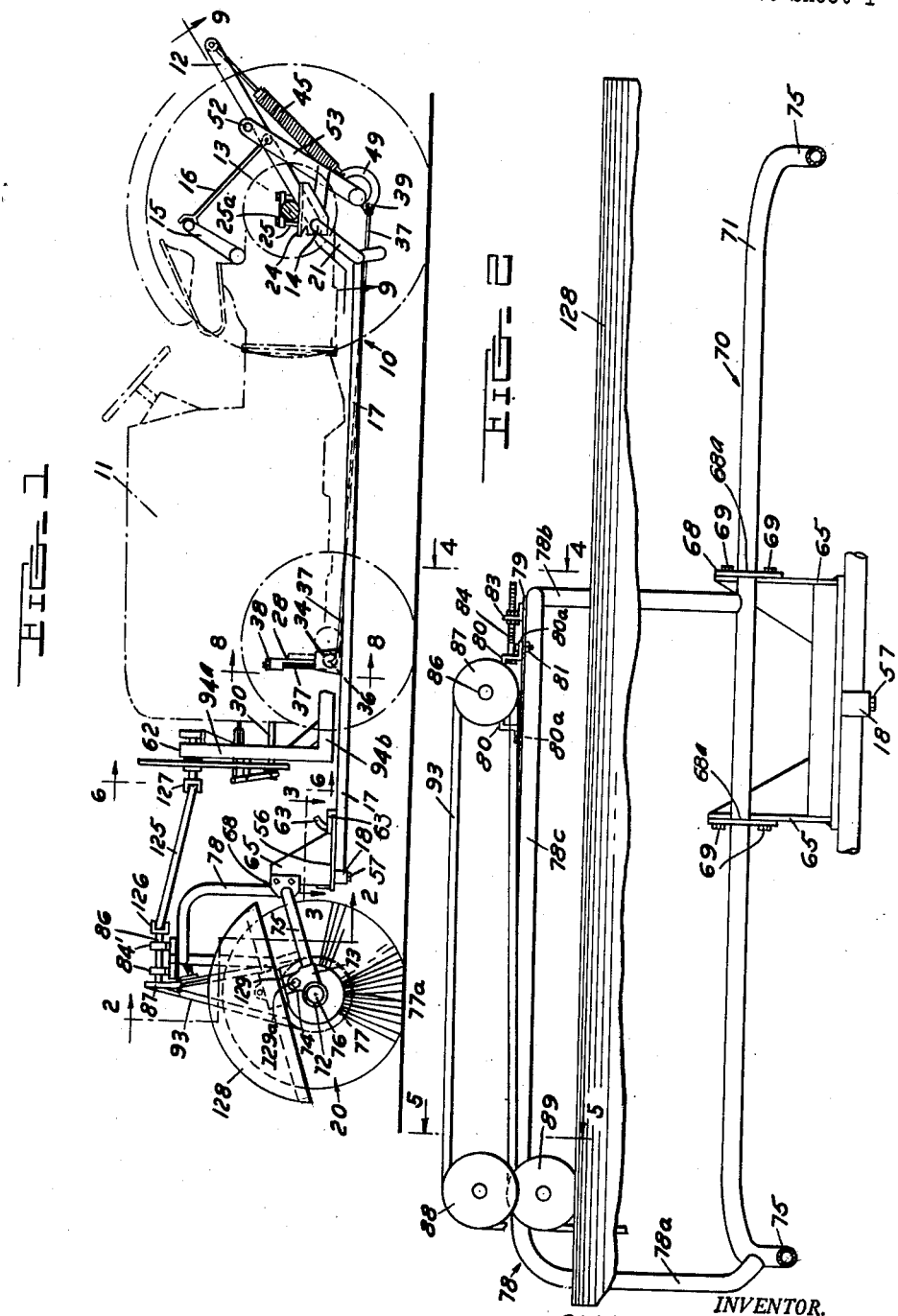

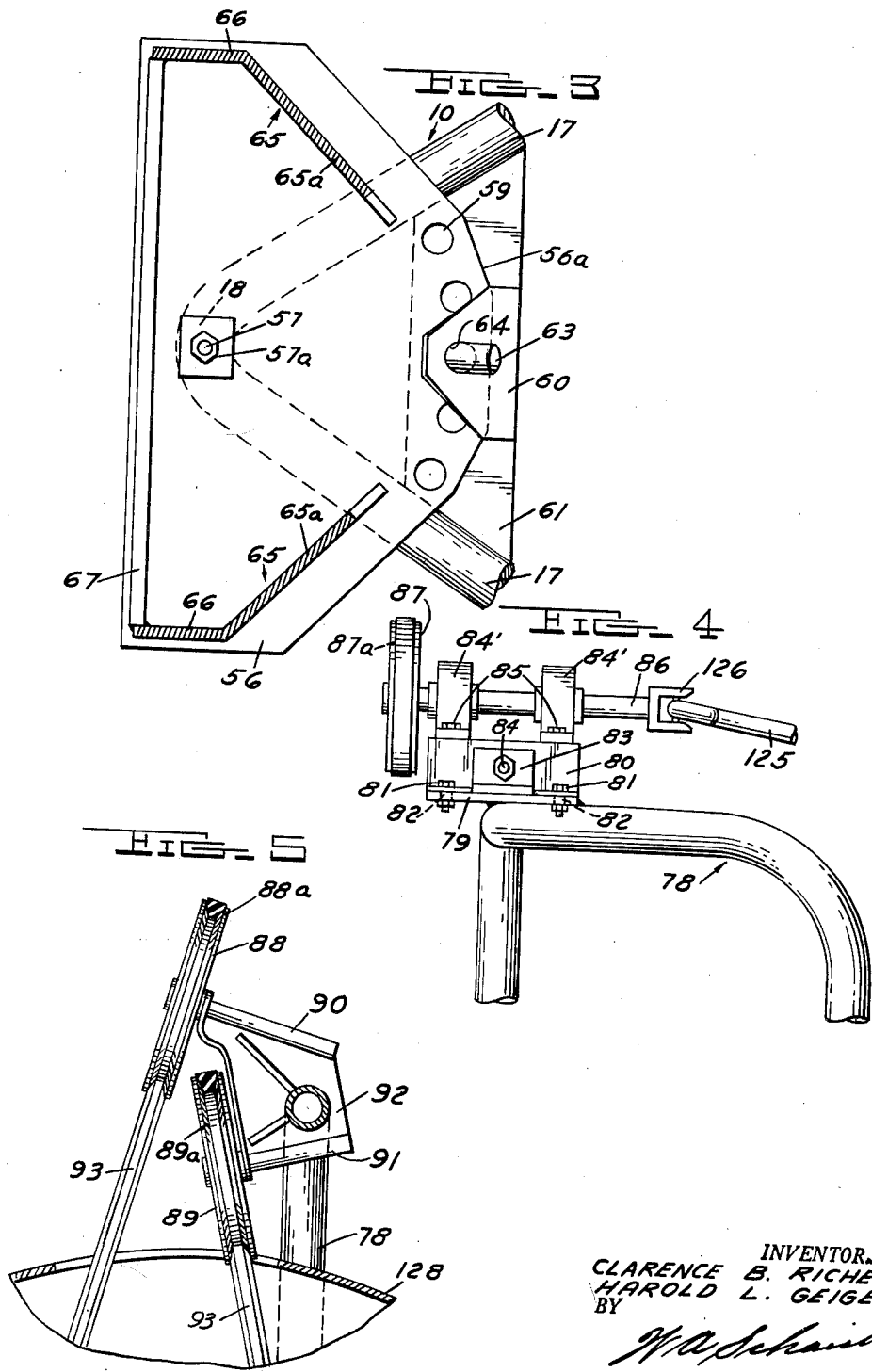

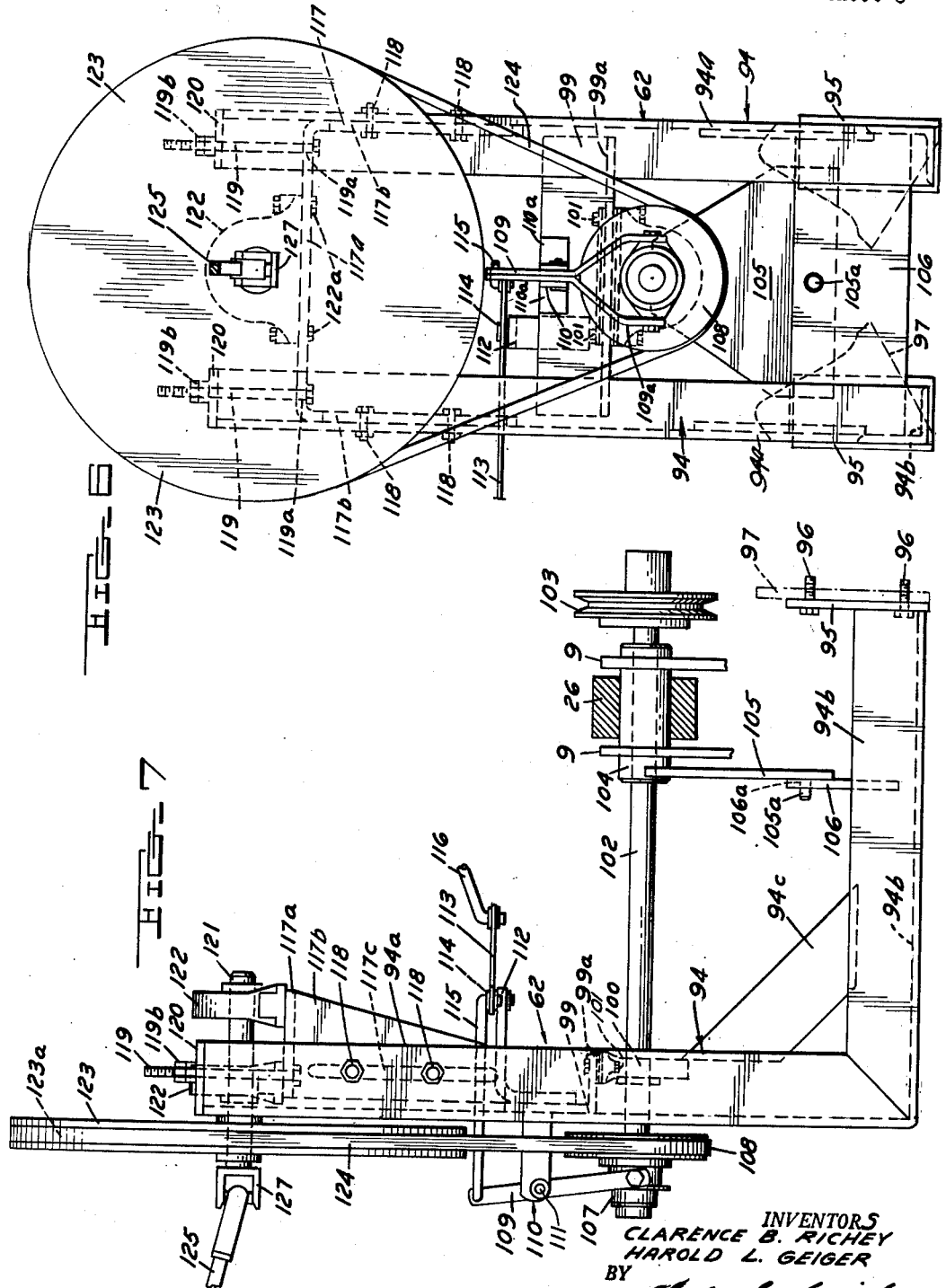

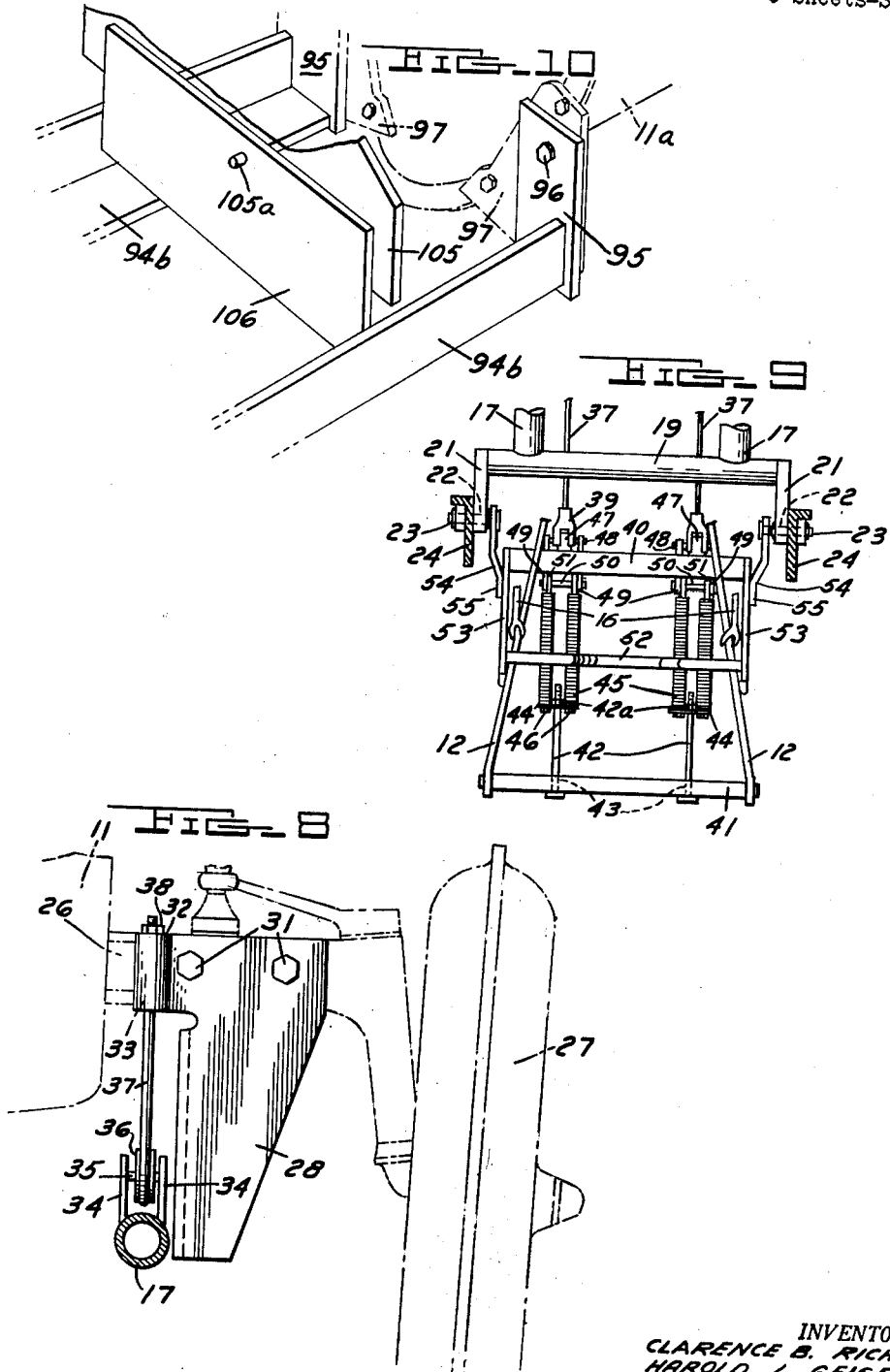

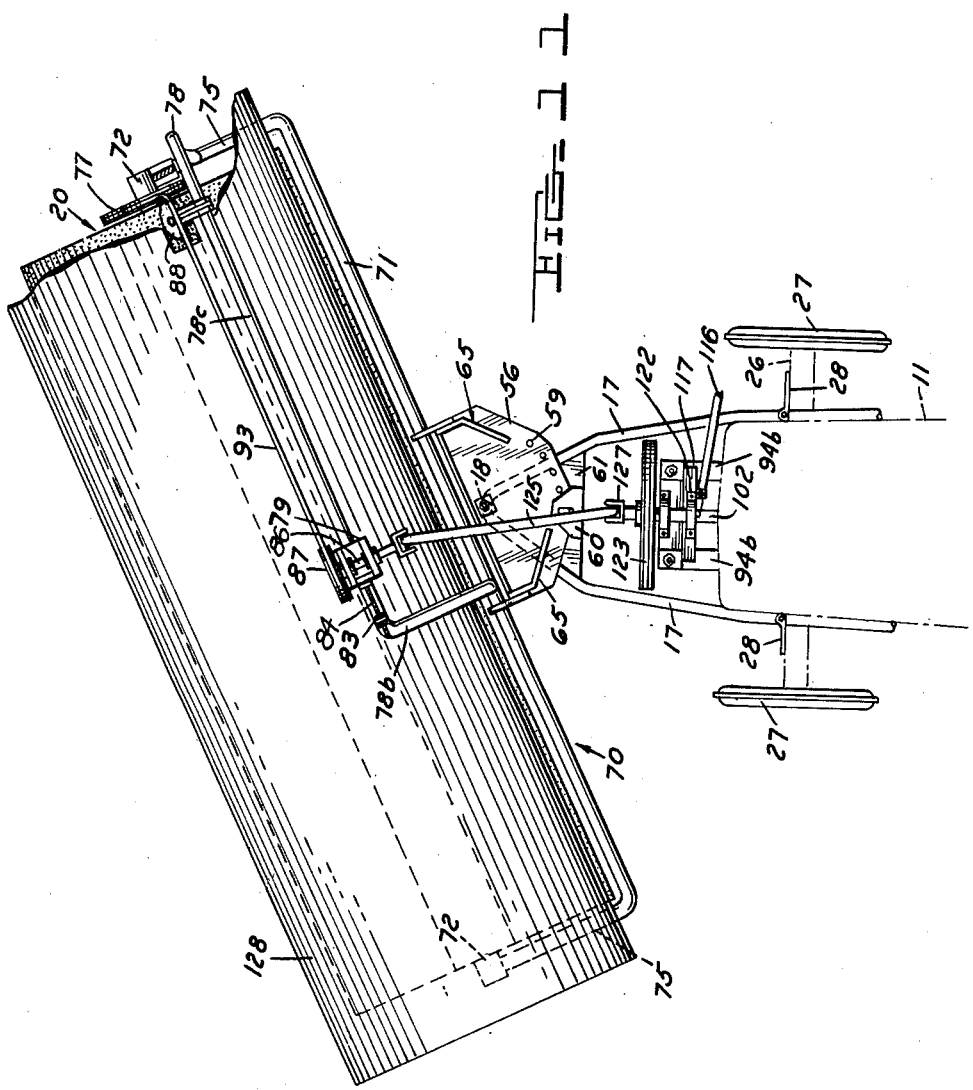

2,673,997

UNITED STATES PATENT OFFICE 2,673,997

SWEEPER

Clarence B. Richey, Royal Oak, and Harold L. Geiger, Detroit, Mich., assignors, by mesne assignments, to Ford Motor Company, Dearborn, Mich., a corporation of Delaware Application January 19, 1950, Serial No. 139,394

1 Claim. (Cl. 15—82)

This invention relates to a tractor mounted and operated sweeper for cleaning roadways and the like.

There is frequently need for a sweeper for cleaning the sidewalks, streets or storage areas surrounding an industrial plant. It is usually not economical for a small concern to invest in a regular street sweeper unit for part time use in keeping the streets and sidewalks surrounding its buildings free from light snow or debris. Many industrial plants, however, do have a prime mover on which a sweeper could be readily mounted and such prime mover is more often than not a tractor which has a multiplicity of uses about the plant.

It would, therefore, appear that a sweeper which could be readily mountable or demountable from the tractor, would permit such plants to enjoy the benefits of a sweeper without a large initial outlay of capital and to further the usefulness of the tractor.

Accordingly, it is an object of this invention to provide an inexpensive sweeper attachment for mounting on a tractor for cleaning roads or sidewalks.

Another object of this invention is to provide a sweeper for a tractor having a hydraulically operated draft linkage utilizing such draft linkage for elevating the rotary sweeping element to a transporting position.

Still another object of this invention is to provide a sweeper for front mounting on a tractor and operable by a power take-off from the tractor engine.

A further object of this invention is to provide an improved tractor mounted sweeper which may be variably angled with respect to the line of travel of the tractor for depositing the swept material to either side for ease of collection.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of a tractor showing the sweeper attachment of this invention mounted thereon.

Figure 2 is a sectional view taken along the plane 2—2 of Figure 1.

Figure 3 is a cross sectional view taken along the plane 3—3 of Figure 1.

Figure 4 is an enlarged detail sectional view taken substantially along the plane 4—4 of Figure 2.

Figure 5 is an enlarged detail cross sectional view taken along the plane 5—5 of Figure 2.

Figure 6 is an enlarged cross sectional view taken along the plane 6—6 of Figure 1.

Figure 7 is a side view of Figure 6.

Figure 8 is an enlarged detail sectional view taken along the plane 8—8 of Figure 1.

Figure 9 is a detail sectional view taken along the plane 9—9 of Figure 1.

Figure 10 is a detail perspective view of the front pulley mounting bracket.

Figure 11 is a plan view of the sweeper.

As shown on the drawings:

This invention comprises a tractor mounted sweeper wherein the engine of the tractor is utilized to rotate the sweeping brush of the sweeper. A frame is mounted underneath the tractor and is so connected to the vertically swingable draft links of the tractor that the forward end of such frame may be elevated or lowered by such draft links to raise or lower a rotary sweeping element mounted on the front of such frame. The sweeping element is vertically, pivotally mounted on the front end of the frame so that the sweeping element may be adjusted angularly with respect to the line of travel of the tractor. A bracket is mounted on the front end of the tractor and such bracket supports an arrangement of pulleys having a power connection to the tractor engine and such pulleys drive a telescoping drive shaft extending forwardly for connection to a horizontal shaft mounted above the sweeping element. A second system of belt driven pulleys transmits power from the horizontal shaft to the sweeping element. The sweeper when mounted upon the tractor can be readily raised from engagement with the ground surface by actuation of the hydraulically operated draft links for convenient transport.

In Figure 1 there is shown in assembled relation a tractor mounted sweeper comprising essentially a frame 10 mounted underneath a tractor 11 having a cylindrical sweeping brush 20 mounted on the front end of such frame for pivotal movement about a vertical axis. Brush 20 is rotated by the power derived from the front power take-off shaft 30 provided on tractor 11 through a system of belts and shafting as will be later described. Tractor 11, with which the sweeper of this invention is preferably utilized, is of well known make and includes a pair of transversely spaced draft links 12 pivotally mounted on the rear axle housing 13 as at 14. Draft links 12 are vertically raised by the hydraulically operated lifting arms 15 actuated by the built-in hydraulic system of the tractor which is controlled by a manual lever (not shown). Rods 16 connect lifting arms 15 to draft links 12.

Frame 10 comprises a pair of transversely spaced, longitudinally extending tubes 17 bent inwardly at their forward ends to a substantially V-shaped configuration, best shown in Figure 11, and such ends are there joined by welding to a vertically disposed tubular hub member 18 provided for a purpose which will later appear. The rear ends of tubes 17 are spaced apart by a transverse tubular shaft 19 (Figure 9) welded in abutting relation to such tube ends. Shaft 19 projects slightly beyond each tube 17 and on each end of shaft 19 there is secured by welding an upwardly sloping arm 21. The upper end of each arm 21 is pivotally secured to a depending bracket 24 mounted on rear axle housing 13 by a U-bolt 25 and clamp 25a as shown in Figure 1. A transverse aperture 22 in the end of each arm 21 permits mounting of such arms on a linch pin 23 provided on each bracket 24.

The front end of tractor 11 is pivotally mounted on an axle 26 and a wheel 27 is rotatably mounted in conventional manner on each end of axle 26. A depending bracket 28 is secured to each end of axle 26 by a pair of bolts 31 as shown in Figure 8. A vertically disposed lug 32 having a bore 33 is formed on the inner edge of each bracket 28. A pair of spaced upstanding lugs 34 are welded to each tube 17 of frame 10 and such lugs are disposed beneath lug 32 and support a transverse pin 35. A pulley 36 is rotatably mounted on pin 35 between the upstanding lugs 34.

The front end of frame 10 is adjustably suspended from bracket 28 by a pair of cables 37 respectively passing underneath pulleys 36 thence upwardly through bore 33 of lug 32. The upper end of each cable 37 is suitably secured to a washer 38 placed adjacent to the top side of lug 32 to secure the end of cable 37 thereto. Cables 37 extend rearwardly and a clevis 39 is secured to the rear end of each cable 37 as shown in Figure 9. Each clevis 39 is pivotally secured to a cross bar 40 as will be presently explained.

A drawbar 41 is mounted on the ends of trailing draft links 12 in the usual manner and a pair of spaced, forwardly projecting bolts 42 are placed within spaced apertures 43 provided in drawbar 41. The forward end of each bolt 42 is centrally secured to a spring anchor member 44 by a nut 42a. A pair of spaced coiled springs 45 have their rear ends respectively secured to each anchor 44 by bolts 46 which pass through a suitable eye (not shown) on the end of each coil spring 45. The forward end of each spring 45 is connected to clevis 39 in the following manner: Clevises 39 are pivotally secured respectively by transverse pins 48 to a pair of spaced lugs 47 welded to the forwardly facing edge of bar 40. A substantially semi-circular link 49, best shown in Figures 1 and 9, is mounted on each end of transverse pins 48, such links being arcuately shaped to surround the underside of bar 40. A transverse pin 50 connects the rear ends of each pair of links 49 and an integral hook 51 formed on the end of each coil spring 45 surrounds pins 50 to connect such ends of springs 45 to each cable 37 through the connection of links 49 and clevis 39.

A cylindrical bar 52 rests transversely on top of draft links 12 as shown in Figure 1 and downwardly sloping arms 53 welded to respective ends of bar 52 and bar 40 connect such bar to cross bar 40. A stabilizing member 54 is pivotally mounted on each pin 23 and the rear end 55 of each stabilizer bar 54 is inwardly offset as shown in Figure 9 for welding to the adjacent arm 53. From an inspection of Figure 1 it will be readily apparent that raising or lowering of the draft links 12 will in effect respectively shorten or lengthen cables 37. Inasmuch as each cable 37 is secured at one end to front axle 26 and is connected to the forward portion of frame 10 through the mounting of pulley 36 to each tube 17, the forward end of frame 10 will be raised or lowered depending upon the direction of movement of draft links 12. Springs 45 absorb undue strains or shocks placed on the draft links 12 when encountering obstructions or depressions with the sweeper.

Referring to Figure 3, a quadrant-like member 56 is pivotally secured to hub 18 by a vertical bolt 57 such bolt being rotatably secured to hub 18 by a nut 57a. Quadrant 56 is of plate-like construction and is provided with a substantially rounded rear edge 56a. A plurality of positioning holes 59 are provided adjacent the rear edge 56a on an arc having the axis of bolt 57 as its center. The rear edge 56a of quadrant 56 passes underneath an overhanging bracket 60 welded to a transverse member 61 secured by welding to frame members 17. A pin 63 insertable through a vertically disposed aperture 64 provided in bracket 60 is cooperable with a selected hole 59 in quadrant 56 to secure such quadrant in the selected angular position for a purpose to be later described.

On the sides of quadrant 56 there are welded vertical plates 65 having forward portions 66 parallel to one another and a rear inwardly bent portion 65a. Each plate 65 is secured to quadrant 56 by welding and the forward edges of plates 65 are joined by a vertical plate 67 welded thereto. Near the upper forward edge of each forward portion 66 there is secured a bracket 68 by a pair of bolts 69, which bracket transversely supports a brush supporting frame 70 (Figure 2).

Frame 70 comprises a U-shaped tubular member having a bight portion 71 and spaced parallel arms 75 for rotatably supporting the cylindrical brush 20. The bight portion 71 of U-shaped frame 70 is transversely secured by welding within transverse apertures 68a provided in each bracket 68. A pair of transverse tubular shaft housings 72 are provided, each having an integral, rearwardly projecting socket portion 73 receiving the end of each arm 75 of frame 70 and the ends of arms 75 are welded within the sockets 73, as shown in Figure 1. Each housing 72 rotatably supports one end of a shaft 76 of brush 20 in bearing relationship. A pulley 77 is mounted on the right hand end of shaft 76 as shown in Figure 11 and is placed between right hand housing 72 and brush 20 for driving brush 20 as will be later explained.

A vertical, substantially U-shaped tubular pulley supporting frame 78 is welded to the top of frame 70 (Figures 1 and 2). The left hand depending arm 78a of frame 78 as shown in Figure 2 is provided with an inwardly bent bottom end which is welded to the left hand arm 75 of frame 70. The right hand arm 78b of frame 78 is offset 90 degrees with respect to the bight portion 78c of frame 78, as shown in Figure 11, and such arm is welded to the top of bight portion 71 of frame 70 adjacent to the inside face of right hand bracket 66.

A rectangular plate 79 is horizontally welded to the top of the right hand end of bight portion 78c of frame 70 as shown in Figures 2, 4 and 11. An inverted U-shaped base 80 provided with outwardly extending flanges 80a is mounted on top of plate 79 and is secured to such plate by vertically disposed bolts 81. Bolts 81 cooperate with longitudinal slots 82 in plate 79 for adjustably positioning base 80 relative to frame 78. A short angular member 83 is welded adjacent the right hand edge of plate 79 as shown in Figure 2 and a transverse hole (not shown) is provided in the upstanding leg of angular member 83. A horizontally disposed bolt 84 mounted in the depending arm of base 80 adjacent angular member 83 passes through the hole in angular member 83 and check nuts placed on bolt 84 on opposite sides of the upstanding arm of angular member 83 provide a convenient arrangement for accurately adjusting base 80 for a reason to presently appear. A pair of spaced opposed pillow blocks 84' are secured by bolts 85 to the top of base 80 to rotatably support a shaft 86 transversely of frame 78 in such fashion that the axis of shaft 86 is substantially coincident with a vertical plane passed through the longitudinal axis of tractor 11 when the axis of bush 20 is disposed perpendicularly with respect to such longitudinal tractor axis. A pulley 87 provided with a V-shaped groove 87a about its periphery is mounted on the forward end of shaft 86.

Adjacent the left hand end of frame 78 as shown in Figure 2 there is mounted a pair of idler pulleys 88 and 89 and each of such pulleys is respectively provided with a V-shaped peripherial groove 88a and 89a. Pulleys 88 and 89 are mounted respectively on shafts 90 and 91 (Figure 5) and such shafts are welded to a plate-like bracket 92 secured by welding to bight portion 78c of frame 78. Shafts 90 and 91 are angularly disposed on bracket 92 as shown in Figure 5 to align a V-belt 93 surrounding pulley 87 with pulley 77 secured to the right hand end of brush shaft 76 as shown in Figure 11. Belt 93 engages the V-shaped groove 88a of pulley 88 in passing around one side of pulley 77 and such belt engages groove 89a in pulley 89 on returning from pulley 77.

Shaft 86 is driven by a power-take-off connection to the tractor engine provided on the front end of the engine. A frame 62 comprising a pair of spaced L-shaped side members 94 (Figures 6 and 7), constructed preferably of angle iron, are mounted on the tractor in such fashion that the upright portion 94a of side members 94 are adjacent the front of the tractor as shown in Figure 1. A pair of vertical plate members 95 are respectively welded across the rear ends of the horizontal portions 94b of side members 94 and a pair of bolts 96 inserted through suitable apertures in plates 95 secure such plates respectively to brackets 97 suitably secured in depending relation to the tractor motor 11a, as best shown in Figures 7 and 10. The upright portion of each side member 94 is braced relative to the horizontal portion 94b by a diagonal brace 94c. A transverse angle iron support member 99 is welded intermediate the bottom and top portions of side members 94. One leg 99a of angle iron support 99 is horizontally disposed and a bearing block 100 is secured in depending relationship from such horizontal portion by a pair of bolts 101. Bearing 100 is provided to rotatably support the front end of a horizontal drive shaft 102 while the rear end of shaft 102 projects through a sleeve 104 as shown in Figure 7. Sleeve 104 defines a central pivotal mounting for the tractor front axle 26 and is supported by tractor frame members 9. Shaft 102 projects through sleeve 104 to detachably connect to the crank shaft pulley 103.

A substantially triangular shaped plate-like supporting member 105 is secured by welding to the forward end of sleeve 104. A vertically disposed plate 106 is transversely secured by welding to the horizontal portions 94b of frame 94. A pin 105a transversely welded to support 105 is inserted through a suitable aperture 106a in plate 106 thus mounting frame member 94 on sleeve 104.

On the extreme forward end of shaft 102 there is mounted a conventional clutch 107 which rotatably engages or disengages a pulley 108 with drive shaft 102. Clutch 107 is actuated by an offset lever 109 pivotally supported by a forwardly projecting bracket 110 comprising two spaced apart, horizontal L-shaped members having one arm projecting forwardly and the other arm welded to the front face of support 99. Lever 109 is offset as shown at 109a for connection to clutch 107 as shown in Figure 6 and such lever is pivotally secured between the spaced apart L-shaped members 110 by a transverse bolt 111. A rearwardly projecting L-shaped bracket 112 is secured by welding to the rearwardly facing surface of support 99 and a plate-like lever 113 is pivotally mounted on the rear end of bracket 112 by a vertical pin 114, while rod-like link 115 connects the upper end of lever 109 with lever 113. A rearwardly projecting rod 116 is pivotally connected to plate-like lever 113 and such lever extends rearwardly to a position adjacent the operator's seat whereby the operator of the tractor can engage or disengage clutch 107 without leaving the seat of the tractor.

Near the top of side members 94 there is provided a vertically adjustable, substantially inverted U-shaped support member 117 having a horizontal bight portion 117a and depending, substantially triangularly shaped side portions 117b. A vertical slot 117c is provided in each of the side portions 117b and a pair of transverse bolts 118 provided in each side member 94a in vertically spaced relationship are cooperable with the adjacent slot 117c whereby the support member 117 may be adjustably positioned vertically relative to the tractor for a purpose to be presently explained. Vertical bolts 119 are inserted through transverse holes 119a respectively provided in bight portion 117a near the ends thereof and such bolts extend upwardly through suitable apertures respectively provided in caps 120 welded to the top of each upright portion 94a of frame 94. A pair of nuts 119b surround the upper end of each bolt 119 and one of such nuts rests on top of each cap 120. Bolts 119 provide vertical adjustment of support 117 within the limits of slot 117c and bolts 118 lock support 117 in the desired position of adjustment.

A substantially semi-cylindrical guard 128 is mounted above brush 20 to prevent debris from being scattered by the revolving brush and such brush guard is pivotally secured to upstanding lugs 74 on shaft housings 72 by brackets 129 depending from the underside of cover 128. Bolts 129a pivotally secure such cover to lugs 74.

A horizontal shaft 121 (Figure 7) is rotatably mounted in the same vertical plane as shaft 102 in a pair of aligned spaced pillow blocks 122 secured to the bight portion 117a of support 117 by bolts 122a. A large diameter pulley 123 provided with a V-shaped peripherial groove 123a is mounted on the forward end of shaft 121 and a V-belt 124 fitting in groove 123a connects pulley 123 with pulley 108. A telescoping shaft 125 is connected by universal joints 126 and 127 respectively, to shafts 86 and 121, such telescoping shaft permitting vertical and horizontal angular movements of brush 20 as will be described.

Operation

To use the sweeper of this invention the desired working angle of brush 20 is selected by removing pin 63 and swinging brush 20 to the desired angle whereupon pin 63 is dropped into the selected hole 59 in quadrant 56. Brush 20 is then lowered into contact with the road surface by lowering draft links 12 in the usual manner. Such lowering of the links in effect increases the length of cable 37 thereby permitting the front end of frame 17 to drop and thus enabling the brush to contact the road surface. It is desirable to maintain a certain amount of tension in cable 37 so that at least a portion of the weight of brush 20 will be carried by springs 45 thereby providing a resilient mounting as well as keeping a substantial portion of the brush weight off the bristles to increase the life of the brush.

With the tractor motor running, clutch 107 is engaged by movement of rod 116 whereupon pulley 108 is rotatably engaged with rotating shaft 102 to drive pulley 123 and thus rotate telescoping shaft 125. Shaft 125 in turn rotates shaft 86 to rotate pulley 87 whereupon pulley 77 drives brush 20. It should be noted that shaft 125 telescopes to permit raising and lowering of brush 20 when it is necessary to raise such brush in order to clear obstacles in the path of the sweeper without disengaging clutch 107. Raising of draft links 12 lifts bar 52 and as such bar is connected to arms 53, such arms will be rotated in a counter-clockwise direction as shown in Figure 1. Cables 37 being connected to the rear ends of draft links 12 through the connection of spring 45 and links 49 are then effectively shortened whereby the front end of frame 10 is raised upwardly to lift brush 20 clear of the ground. Conversely, lowering of draft links 12 in effect, increases the length of cables 37 thereby lowering the front end of frame 10 until brush 20 contacts the ground.

It will, therefore, be apparent from the above description that there is here provided a tractor mounted sweeper which can be conveniently assembled to the tractor with a minimum of time and effort and which is driven by the front power take-off of the tractor thereby providing a self-contained, low cost unit. The sweeping brush is readily lifted out of engagement with the road surface by actuation of the hydraulically controlled draft links of the tractor so that the sweeper may be quickly and easily transported to the area to be swept. The pulley and belt arrangement provided for driving the brush is relatively simple and sturdily constructed so that the power losses will be kept to a minimum.

It will, of course, be understood that various details of construction may be varied through a wide range without departing from the principles of this invention and it is, therefore, not the purpose to limit the patent granted hereon otherwise than necessitated by the scope of the appended claim.

We claim:

For use with a wheeled tractor having a power-lifted, trailing hitch link and a sleeve constructed and arranged to pivotally mount the tractor front axle to the tractor, the improvement comprising a first frame structure underlying the tractor and adapted to be pivotally suspended on the tractor rear portions for vertical movement, a rotatable sweeping element, means for horizontally adjustably mounting said sweeping element on the front end of said first frame in a position forwardly of the tractor, whereby the position of said sweeping element is adjustable both horizontally and vertically relative to the tractor a second frame structure, means for supporting said second frame structure on said sleeve, a shaft journaled on said second frame structure and passing through said sleeve for connection to the tractor engine, motion transmitting means on said second frame structure for drivingly connecting said shaft with said sweeping element, said last mentioned means including a universally jointed, extensible shaft permitting vertical and horizontal adjustment movement of said sweeping element relative to the tractor, and means for resiliently connecting said first frame structure to said power-lifted tractor hitch link to resiliently vertically position said sweeping element in proportion to the height of said hitch link, thereby permitting said sweeping element to yield upwardly to pass over obstructions.

References Cited in the file of this patent

UNITED STATES PATENTS

| Number | Name | Date |
|---|---|---|
| 2,212,677 | Wagner | Aug. 27, 1940 |
| 2,235,277 | Bradley | Mar. 18, 1941 |
| 2,248,012 | Phillips | July 1, 1941 |
| 2,330,025 | Bentley et al. | Sept. 21, 1943 |
| 2,388,411 | Hicks | Nov. 6, 1945 |
| 2,440,550 | Martin | Apr. 27, 1948 |
| 2,558,123 | Brown et al. | June 26, 1951 |